United States Patent
Xu et al.

(10) Patent No.: US 10,609,071 B2
(45) Date of Patent: Mar. 31, 2020

(54) PREVENTING MAC SPOOFING

(71) Applicant: HEWLETT-PACKARD DEVELOPMENT COMPANY, L.P., Houston, TX (US)

(72) Inventors: Xunteng Xu, Beijing (CN); Jun Qing Xie, Beijing (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/501,223

(22) PCT Filed: Sep. 30, 2014

(86) PCT No.: PCT/CN2014/087861
§ 371 (c)(1),
(2) Date: Feb. 2, 2017

(87) PCT Pub. No.: WO2016/049833
PCT Pub. Date: Apr. 7, 2016

(65) Prior Publication Data
US 2017/0230415 A1    Aug. 10, 2017

(51) Int. Cl.
*H04W 12/12* (2009.01)
*H04L 29/06* (2006.01)
(Continued)

(52) U.S. Cl.
CPC ........ *H04L 63/1466* (2013.01); *H04L 5/0048* (2013.01); *H04L 41/06* (2013.01);
(Continued)

(58) Field of Classification Search
CPC ............... H04L 63/0876; H04L 63/123; H04L 63/1466; H04L 63/1483; H04L 63/18; H04W 12/06–12/12
See application file for complete search history.

(56) References Cited

U.S. PATENT DOCUMENTS 7,134,012 B2    11/2006   Doyle et al.
7,336,670 B1    2/2008    Calhoun et al.
(Continued)

FOREIGN PATENT DOCUMENTS

WO    WO 2015/000158 A1 *   1/2015

OTHER PUBLICATIONS

Wang et al., Practical User Authentication Leveraging Channel State Information (CSI), ASIA CCS'14, Jun. 2014.*
(Continued)

*Primary Examiner* — Minh Dinh
(74) *Attorney, Agent, or Firm* — HPI Patent Department

(57) ABSTRACT

Example embodiments relate to preventing MAC spoofing. In this manner, the embodiments disclosed herein enable sending, from a requesting mobile device, a generic advertisement service (GAS) message on a channel. Responsive to sending the GAS message, a first GAS response message and a second GAS response message may be received on the channel within a predetermined time period after sending the GAS message on the channel. A first CSI fingerprint from the first GAS response message may be compared to a stored CSI fingerprint. A second CSI fingerprint from the second GAS response message may also be compared to the stored CSI fingerprint. Responsive to the first CSI fingerprint being a closer match to the stored CSI fingerprint than the second CSI fingerprint, the requesting mobile device may be connected to an access point associated with first GAS response message.

13 Claims, 2 Drawing Sheets

(51) Int. Cl.

| | |
|---|---|
| *H04W 12/10* | (2009.01) |
| *H04W 76/10* | (2018.01) |
| *H04L 5/00* | (2006.01) |
| *H04L 12/24* | (2006.01) |
| *H04L 29/12* | (2006.01) |
| *H04W 12/06* | (2009.01) |
| *H04W 12/08* | (2009.01) |
| *H04W 84/12* | (2009.01) |
| *H04W 88/02* | (2009.01) |
| *H04W 88/08* | (2009.01) |

(52) U.S. Cl.
 CPC ...... *H04L 61/6022* (2013.01); *H04L 63/0876* (2013.01); *H04L 63/123* (2013.01); *H04L 63/18* (2013.01); *H04W 12/06* (2013.01); *H04W 12/08* (2013.01); *H04W 12/10* (2013.01); *H04W 12/12* (2013.01); *H04W 76/10* (2018.02); *H04W 84/12* (2013.01); *H04W 88/02* (2013.01); *H04W 88/08* (2013.01)

(56) References Cited

U.S. PATENT DOCUMENTS

| | | |
|---|---|---|
| 7,447,184 B1 | 11/2008 | Kharvandikar et al. |
| 2007/0183375 A1 | 8/2007 | Tiwari |
| 2009/0235354 A1* | 9/2009 | Gray ............... H04L 63/1416 726/22 |
| 2011/0161653 A1 | 6/2011 | Keohane et al. |
| 2011/0179486 A1 | 7/2011 | Park et al. |
| 2011/0314147 A1 | 12/2011 | Whelan et al. |
| 2013/0308618 A1 | 11/2013 | Panneerselvam |
| 2014/0233406 A1* | 8/2014 | Chhabra ............ H04W 48/14 370/252 |

OTHER PUBLICATIONS

Jiang et al., Rejecting the Attack: Source Authentication for Wi-Fi Management Frames using CSI Information, 2013.*
"Preventing DHCP Starvation Attacks", Mar. 11, 2011.
Jiang, Z et al, "Rejecting the Attack; Soure Authentication for Wi-Fi Management Frames Using CSI Information", May 22, 2013.

* cited by examiner

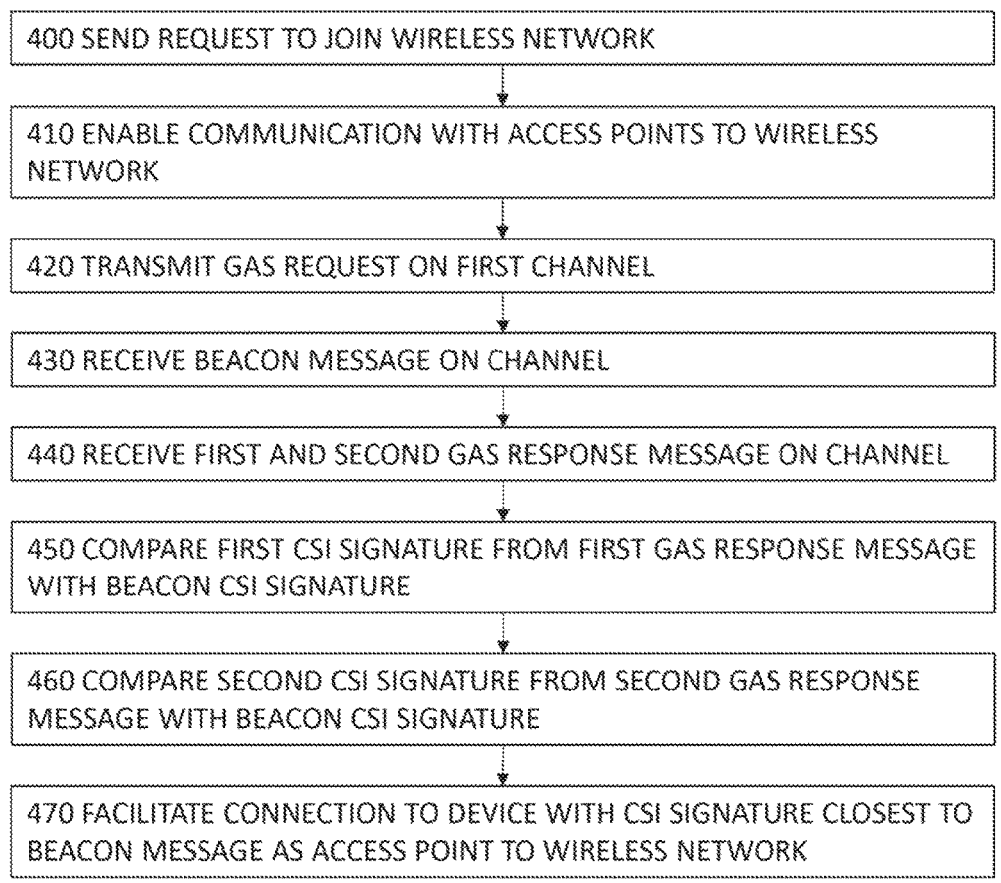

PREVENTING MAC SPOOFING

BACKGROUND

A computing device trying to connect to a wireless network may connect to the wireless network via a set of available access points for that wireless network. An access point may be a computing device that allows a requesting computing device to connect to the wireless network using a well-known standard (e.g., an IEEE standard). Each access point to the wireless network may use a respective channel broadcasting a unique frequency to communicate with computing devices. As such, a computing device attempting to connect to a wireless network may attempt to connect to the wireless network via an access point on a channel that broadcasts the particular frequency of the access point.

BRIEF DESCRIPTION OF THE DRAWINGS

The following detailed description references the drawings, wherein:

FIG. 4 is a flowchart of an example method for execution by a system for preventing MAC spoofing.

DETAILED DESCRIPTION

Figure 1:
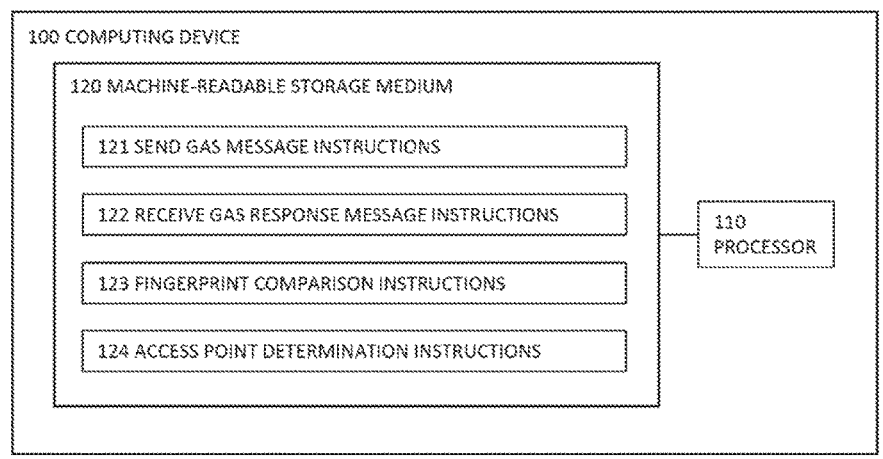
FIG. 1 is a block diagram of an example computing device for preventing MAC spoofing.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As mentioned above, a computing device trying to connect to a wireless network may connect to the wireless network via a set of available access points for that wireless network. An access point may be a computing device that allows the requesting computing device to connect to the wireless network using a well-known standard (e.g., an IEEE standard).

The standards used to allow a computing device to connect via an access point provide a predetermined set of information that may be available for the computing device while the computing device determines which access point to use. For example, with the IEEE 802.11u standard, the ability of a computing device to automatically discover, authenticate, and use nearby access points may include query capabilities of the access point. While the examples are described herein in relation to the IEEE 802.11u standard, other standards may also be used. As such, the examples described herein are not limited to use with the IEEE 802.11u.

In some examples, an access point using the IEEE 802.11u standard may allow an unauthenticated computing device to query an access point for its capabilities and backhaul access networks before connecting to the access point. The capabilities that an unauthenticated computing device may query may include, for example, service set identifier (ssid), access point identifier, signal strength of the access point to the wireless network, backend server information, operator kind, data plan, data rate, traffic load, other characteristics of expected performance if connected, and/or other capabilities.

The IEEE 802.11u standard may allow this querying communication through generic advertisement service (GAS) messages. For example, a computing device querying an access point on a channel may send a GAS request message on the channel to the access point, and may receive a GAS response message from the access point with information related to the capabilities available via the access point. The computing device may send multiple GAS messages simultaneously to multiple access points on multiple channels in order to make the connection process to the wireless network more efficient.

The GAS messages enabled by the IEEE 802.11u standard may not be encrypted and may be exchanged (and accessible) in the open channel. For example, the messages may be verified merely by MAC source address, making the messages vulnerable to attackers. As such, security issues may arise with the use of these messages to connect to an access point.

In some examples, a security issue may arise due to an attacker (e.g., a MAC specter) monitoring ongoing frames in the wireless channel, detecting a GAS request message from a computing device to an access point, and performing MAC spoofing by forging a GAS response message with a failure code and the MAC source code in the message received from the mobile device. If the forged GAS response message reaches the computing device before the legitimate GAS response message from the access point, the computing device may be fooled by the attacker. In this example, the computing device would not use that access point, with the query process being terminated due to the forged GAS response message from the attacker. In another example, the attacker may try to get the device to communicate with it rather than the legitimate access point, thus obtaining data from the computing device. Other issues may also arise based on the attacker fooling the computing device.

Examples disclosed herein address this issue by preventing MAC spoofing. For example, a requesting computing device may send a GAS request message on a channel to an access point. Responsive to sending the GAS message, the computing device may wait a predetermined amount of time for receiving GAS response messages. The computing device may receive a first GAS response message and a second GAS response message in the predetermined amount of time. The first GAS message may be associated with an access point on the channel, while the second GAS message may be associated with an attacker on the channel. Responsive to receiving the GAS messages, the computing device may compare a first channel state information ("CSI") fingerprint from the first GAS message to a stored CSI fingerprint for the access point. The computing device may also compare a second CSI fingerprint from the second GAS message to the stored CSI fingerprint. Responsive to the first CSI fingerprint being a closer match to the stored CSI fingerprint than the second CSI fingerprint, the computing device may connect to an access point associated with the first GAS response message.

In some examples, there may be multiple access points available on a channel. As such, there may be multiple stored CSI fingerprints available for comparison against the CSI fingerprints from each GAS message. In one example, a stored CSI fingerprint from the multiple stored CSI fingerprints may be selected based on the source MAC address of the GAS response messages. In this example, a MAC address may be stored in association with each stored CSI fingerprint.

The computing device may choose to compare CSI fingerprints from the GAS response messages (instead of other information that may be obtained from the GAS message) to a stored CSI fingerprint for the access point on the channel to determine which device on the channel is the access point. A spoofer device that may attack the computing device as it attempts to query an access point on a channel may likely not be close in physical proximity to the access point. Because CSI fingerprints are influenced by a physical location of a device, a comparison of CSI fingerprints may provide a measure of surety in determining which device sending a GAS response message is the legitimate access point. Further, by waiting until multiple GAS response messages are received, the computing device does not merely connect or abandon an access point based on a first (and potentially fake) GAS response message.

Referring now to the drawings, FIG. 1 is a block diagram of an example computing device 100 for preventing MAC spoofing. Computing device 100 may be a clod server, a mainframe, notebook, desktop, tablet, workstation, mobile device, or any other device suitable for executing the functionality described below. In some examples, computing device 100 may be part of a system of computing devices, such that each computing device in the system may comprise the functionality and/or structure of computing device 100. In the embodiment of FIG. 1, computing device 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, 124, and/or other instructions to prevent MAC spoofing, as described below. As an alternative or in addition to retrieving and executing instructions, processor 110 may include one or more electronic circuits comprising a number of electronic components for performing the functionality of one or more of instructions 121, 122, 123, 124, and/or other instructions.

In one example, the program instructions 121, 122, 123, 124, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on computing device 100.

Machine-readable storage medium 120 may be any hardware storage device for maintaining data accessible to computing device 100. For example, machine-readable storage medium 120 may include one or more hard disk drives, solid state drives, tape drives, and/or any other storage devices. The storage devices may be located in computing device 100 and/or in another device in communication with computing device 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for preventing MAC spoofing. As detailed below, storage medium 120 may maintain and/or store the data and information described herein.

Send GAS message instructions 121, when executed by processor 110, may send a generic advertisement service (GAS) request message on a channel on which an access point may be available. The send GAS message instructions 121, when executed by processor 110, may send the GAS request message responsive to the computing device 100 sending a request to join a wireless network via which the access point may provide access.

Receive GAS response message instructions 122, when executed by processor 110, may receive a set of GAS response messages within a predetermined time period after the GAS request message is sent on the channel. The receive GAS response message instructions 122, when executed by processor 110, may wait the predetermined time period after the GAS request message is sent to receive the set of GAS response messages. The receive GAS response message instructions 122, when executed by processor 110, may include each GAS response message received in the predetermined time period in the set of GAS response messages.

In some examples, responsive to no GAS response messages being received within the predetermined time period after sending the GAS request message, the receive GAS response message instructions 122, when executed by processor 110, may cause the send GAS message instructions, when executed by processor 110, to send a second GAS request message on a second channel to a potential second access point.

In another example, responsive to sending the GAS message, the receive GAS response message instructions 122, when executed by processor 110, may receive a first GAS response message and a second GAS response message on the channel within a predetermined time period after sending the GAS request message on the channel.

Responsive to multiple messages being included in the set of GAS response messages received by the receive GAS response instructions 122, the fingerprint comparison instructions 123, when executed by processor 110, may compare the respective CSI fingerprints obtained from each GAS response message to a stored CSI fingerprint.

In some examples, a CSI fingerprint may comprise a matrix of complex numbers with a statistical structure that represents state information about the channel and/or the access point. The channel state information may comprise information related to how a signal propagates from the access point. For example, the channel state information may comprise characteristics related to scattering, fading, power decay with distance, and/or other characteristics. In some examples, the channel state information may also include data related to a type of fading distribution, average channel gain, a line-of-sight component, spatial correlation, and/or other data.

A CSI fingerprint may be determined based on the channel state information. As mentioned above, a CSI fingerprint may be a statistical characterization of the channel. In some examples, a CSI fingerprint may be determined based on one or more factors. For example, the CSI fingerprint may be determined based on the receive and transmit vectors and a noise vector of the access point. In some examples, a noise covariance matrix may also be considered (in addition to or instead of the noise vector). In some examples, a CSI fingerprint may be determined using one or more of least-square estimation, minimum mean square error estimation, and/or in other ways.

For example, responsive to a first GAS response message and a second GAS response message being received in the set of GAS response messages, the fingerprint comparison instructions 123, when executed by processor 110, may determine a first CSI fingerprint from the first GAS response message. The fingerprint comparison instructions 123, when executed by processor 110, may compare the first CSI fingerprint from the first GAS response message to a stored CSI fingerprint. The fingerprint comparison instructions 123, when executed by processor 110, may also determine a second CSI fingerprint from the second GAS response message and may compare the second CSI fingerprint to the stored CSI fingerprint.

The fingerprint comparison instructions 123, when executed by processor 110, may determine a stored CSI fingerprint to use for comparison based on the MAC addresses of the received GAS response messages. For example, when a CSI fingerprint is stored, information such as a MAC address of the message from which the CSI fingerprint was determined may be stored and/or associated with the stored CSI fingerprint. The fingerprint comparison instructions 123, when executed by processor 110, may determine a MAC address from the received GAS response messages and may select a stored CSI fingerprint from the storage medium 120 that is associated with the determined MAC address.

The fingerprint comparison instructions 123, when executed by processor 110, may compare a first CSI fingerprint to the stored CSI fingerprint by comparing the matrix of the first CSI fingerprint with the corresponding matrix of the stored CSI fingerprint. Other methods of comparing the CSI fingerprints may be used as well. The comparison performed by the fingerprint comparison instructions 123, when executed by processor 10, is not limited to the examples described herein.

The fingerprint comparison instructions 123, when executed by processor 110, may determine which CSI fingerprint is closer to the stored CSI fingerprint than the other CSI fingerprints determined from the set of GAS response messages.

In some examples, the stored CSI fingerprint may be obtained from the storage medium 120. In other examples, the stored CSI fingerprint may be obtained from a beacon message, probe message, and/or other type of message received on the channel. For example, the computing device 100 (and/or the send GAS message instructions 121, and/or other component of the computing device 100) may automatically receive a beacon message on the channel. The computing device 100 (and/or the send GAS message instructions 121, fingerprint comparison instructions 123, and/or other component of the computing device 100) may determine a CSI fingerprint from the beacon message and store the CSI fingerprint in the storage medium 120 as a stored CSI fingerprint in the set of stored CSI fingerprints. In another example, the computing device 100 (and/or the send GAS message instructions 121, and/or other component of the computing device 100) may send a request for a probe message from the access point and may receive a probe message on the channel. The computing device 100 (and/or the send GAS message instructions 121, fingerprint comparison instructions 123, and/or other component of the computing device 100) may determine a CSI fingerprint from the probe message and store the CSI fingerprint in the storage medium 120 as a stored CSI fingerprint in the set of stored CSI fingerprints.

In general, beacon messages and probe messages may be more reliably associated with a particular access point than a GAS response message. For example, an access point may send beacon messages at predetermined intervals on the channel. In contrast, an attacker such as a spoofer device may not typically send beacon messages as they may be intercepted by a passive listener and thus may be an easy way to detect an unauthorized device on the channel. As such, receipt of a beacon message may be more reliably associated with the access point on the channel, and the CSI fingerprint determined from a beacon message may be a reliable CSI fingerprint for the access point. Similarly, an access point may send probe messages, while an attacker such as a spoofer device would likely not send probe messages for fear of being detected.

Responsive to only a single message being included in the set of GAS response messages received by the receive GAS response instructions 122, access point determination instructions 124, when executed by processor 110, may facilitate connection of the computing device 100 with the device that sent the GAS response message as the access point to the wireless network. For example, the access point determination instructions 124, when executed by processor 110, may send a message to the access point requesting connection to the device as an access point for the network.

Responsive to multiple messages being included in the set of GAS response messages received by the receive GAS response instructions 122, access point determination instructions 124, when executed by processor 110, may determine which CSI fingerprint from the GAS response messages is closest to a stored CSI fingerprint. For example, responsive to the first CSI fingerprint being the closest match to the stored CSI fingerprint, the access point determination instructions 124, when executed by processor 110, may facilitate connection to a device that send the first GAS message as an access point to the wireless network. To that end, the access point determination instructions 124, when executed by processor 110, may send a message to the access point requesting connection to the device as an access point for the network.

In some examples, the access point determination instructions 124, when executed by processor 110, may also send an alert to the access point responsive to connecting to the access point on the channel. The alert may comprise, for example, information about each other GAS response message received in the set of GAS response messages, information about the devices that sent the other GAS response messages, and/or other information related to the other GAS response messages with respective CSI fingerprints which were not closest to the stored CSI fingerprint. In some examples, the alert may indicate that the devices may be spoofer devices, and/or other attackers that are using the channel.

The computing device 100 may comprise additional instructions related to preventing MAC spoofing. For example, the computing device 100 may comprise instructions to update the stored CSI fingerprint for the access point on the channel. The update instructions, when executed by processor 110, may determine a CSI fingerprint from a management message received on the channel responsive to connecting to the access point. The update instructions, when executed by processor 110, may store the determined CSI fingerprint as a stored CSI fingerprint in the set of CSI fingerprints stored in the storage medium 120. For example, the update instructions, when executed by the processor 110, may replace the stored CSI fingerprint for the access point on the channel with the determined CSI fingerprint from the management message.

Figure 2:
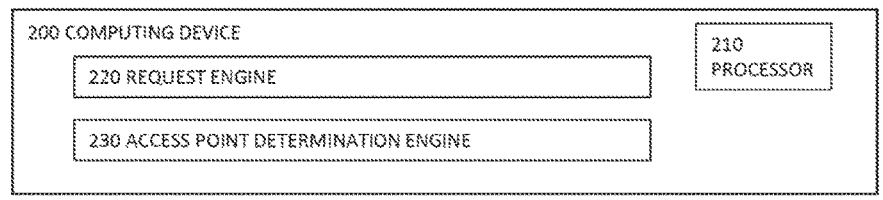
FIG. 2 is a block diagram of an example computing device for preventing MAC spoofing.

FIG. 2 is a block diagram of an example computing device 200 for preventing MAC spoofing. As with computing device 100, computing device 200 may be a cloud server, a mainframe, notebook, desktop, tablet, workstation, mobile device, or any other device suitable for executing the functionality described below. As with processor 110 of FIG. 1, processor 220 may be one or more CPUs, microprocessors, and/or other hardware devices suitable for retrieval and execution of instructions.

As detailed below, computing device 200 may include a series of engines 220-230 for preventing MAC spoofing. Each of the engines may generally represent any combination of hardware and programming. For example, the programming for the engines may be processor executable instructions stored on a non-transitory machine-readable storage medium and the hardware for the engines may include at least one processor of the computing device 200 to execute those instructions. In addition or as an alternative, each engine may include one or more hardware devices including electronic circuitry for implementing the functionality described below.

Request engine 220 may send a GAS request message on a first channel. Request engine 220 may also receive, within a predetermined time period, a set of GAS response messages on the first channel, responsive to sending the GAS request message. In some examples, the request engine 220 may also receive a beacon message on the channel, determine a CSI fingerprint from the beacon message, store the determined CSI fingerprint as a stored CSI fingerprint, and/or otherwise manage beacon messages on the channel. In some examples, the request receipt engine 220 may perform this functionality in a manner the same as or similar to that of the send GAS message instructions 121, fingerprint comparison instructions 123, and/or other instructions of computing device 100. Further details regarding an example implementation of request receipt engine 220 are provided above in connection with send GAS message instructions 121, fingerprint comparison instructions 123, and/or other instructions of FIG. 1.

Access point determination engine 30 may compare a CSI fingerprint of each GAS response message to a stored CSI fingerprint responsive to receiving the set of GAS response messages. The access point determination engine 230 may also determine which GAS response message has a CSI fingerprint closest to the stored CSI fingerprint based on a comparison of the CSI fingerprints of each GAS response message of the set of GAS response messages to the stored CSI fingerprint. The access point determination engine 230 may further send a request to a device associated with the CSI fingerprint closest to the stored CSI fingerprint to connect to the device as an access point for a network.

In some examples, the access point determination engine 230 may determine that the devices associated with the CSI fingerprints that are not closest to the stored CSI fingerprint are spoofer devices. The access point determination engine 230 may also send an alert to the access point indicating that a first device associated with a first CSI fingerprint of the set of fingerprints is a spoofer device responsive to the first CSI fingerprint not being the CSI fingerprint closest to the stored CSI fingerprint.

In some examples, the access point determination engine 230 may connect to an access point associated with the single GAS response message, responsive to the set of GAS response messages comprising a single GAS response message.

In some examples, the access point determination engine 230 may perform this functionality in a manner the same as or similar to that of the fingerprint comparison instructions 123, access point determination instructions 124, and/or other instructions of computing device 100. Further details regarding an example implementation of access point determination engine 230 are provided above in connection with fingerprint comparison instructions 123, access point determination instructions 124, and/or other instructions of FIG. 1.

Figure 3:
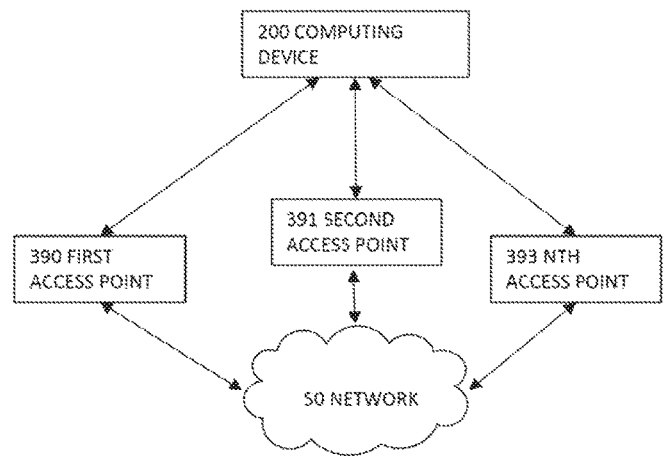
FIG. 3 is a block diagram of an example system for preventing MAC spoofing in communication with a plurality of computing devices.

FIG. 3 is a block diagram of an example system for preventing MAC spoofing, where the computing device 200 is in communication with access point devices 391, 392, 393 over a network. In the example depicted in FIG. 3, the computing device 200 may communicate with first access point 391, second access point 392, . . . , and/or nth access point 393 to the network 50, where each access point may be communicably coupled to the computing device 100 and the network 50. The network 50 may be any wired, wireless and/or other type of network to which the computing device 200 is attempting to connect.

FIG. 4 is a flowchart of an example method for execution by a computing device for preventing MAC spoofing.

Although execution of the methods described below are with reference to computing device 100 of FIG. 1 and/or computing device 200 of FIGS. 2 and 3, other suitable devices for execution of this method will be apparent to those of skill in the art. The method described in FIG. 4 and other figures may be implemented in the form of executable instructions stored on a machine-readable storage medium, such as storage medium 120, by one or more engines described herein, and/or in the form of electronic circuitry.

In an operation 400, a mobile device may send a request to join a wireless network. For example, the computing device 100 (and/or the send GAS message instructions 121, the request engine 220, or other resource of the computing device 100) may send the request. The computing device 100 may send the request in a manner similar or the same as that described above in relation to the execution of the send GAS message instructions 121, the request engine 220, and/or other resource of the computing device 100.

In an operation 410, communication between the mobile device and a set of access points to the wireless network via a respective set of channels may be enabled. For example, the computing device 100 (and/or the send GAS message instructions 121, the request engine 220, or other resource of the computing device 100) may enable communication. The computing device 100 may enable communication in a manner similar or the same as that described above in relation to the execution of the send GAS message instructions 121, the request engine 220, or other resource of the computing device 100.

In an operation 420, a GAS request message to connect to a first access point on the first channel may be transmitted, on a first channel of the set of channels. For example, the computing device 100 (and/or the send GAS message instructions 121, the request engine 220, or other resource of the computing device 100) may transmit the request. The computing device 100 may transmit the request in a manner similar or the same as that described above in relation to the execution of the send GAS message instructions 121, the request engine 220, or other resource of the computing device 100.

In an operation 430, a beacon message may be received on the first channel, where the beacon message comprises a beacon CSI signature. For example, the computing device 100 (and/or the send GAS message instructions 121, the request engine 220, or other resource of the computing device 100) may receive the beacon message. The computing device 100 may receive the beacon message in a manner similar or the same as that described above in relation to the execution of the send GAS message, instructions 121, the request engine 220, and/or other resource of the computing device 100.

In an operation 440, responsive to transmitting the GAS request message, a first GAS response message and a second GAS response message may be received within a predetermined amount of time after transmitting the GAS request message. For example, the computing device 100 (and/or the receive GAS response message instructions 122, request engine 220, or other resource of the computing device 100) may receive the first GAS response message and the second GAS response message. The computing device 100 may receive the GAS response messages in a manner similar or the same as that described above in relation to the execution of the receive GAS response message instructions 122, request engine 220, and/or other resource of the computing device 100.

In an operation 450, a first CSI signature of the first GAS response may be compared with the beacon CSI signature. For example, the computing device 100 (and/or the fingerprint comparison instructions 123, access point determination engine 230, or other resource of the computing device 100) may compare the first CSI signature with the beacon signature. The computing device 100 may compare the first CSI signature with the beacon signature in a manner similar or the same as that described above in relation to the execution of the fingerprint comparison instructions 123, access point determination engine 230, and/or other resource of the computing device 100.

In an operation 460, a second CSI signature of the second GAS response may be compared with the beacon CSI signature. For example, the computing device 100 (and/or the fingerprint comparison instructions 123, access point determination engine 230, or other resource of the computing device 100) may compare the second CSI signature with the beacon signature. The computing device 100 may compare the second CSI signature with the beacon signature in a manner similar or the same as that described above in relation to the execution of the fingerprint comparison instructions 123, access point determination engine 230, and/or other resource of the computing device 100.

In an operation 470, responsive to the second CSI signature being a closer match to the beacon CSI signature than the first CSI signature, connection of the mobile device with a device associated with the second CSI signature as the first access point of the first channel for the mobile device on the wireless network may be facilitated. For example, the computing device 100 (and/or the fingerprint comparison instructions 123, access point determination instructions 124, access point determination engine 230, or other resource of the computing device 100) may facilitate the connection. The computing device 100 may facilitate the connection in a manner similar or the same as that described above in relation to the execution of the fingerprint comparison instructions 123, access point determination instructions 124, access point determination engine 230, and/or other resource of the computing device 100.

The foregoing disclosure describes a number of example embodiments for preventing MAC spoofing. The disclosed examples may include systems, devices, computer-readable storage media, and methods for preventing MAC spoofing. For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-4 are examples and are not intended, to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions for preventing MAC spoofing, the instructions executable by a processor of a computing device to:
   send, from a requesting computing device, a generic advertisement service (GAS) request message on a channel;
   responsive to sending the GAS request message, receive a first GAS response message and a second GAS response message on the channel within a predetermined time period after sending the GAS request message on the channel;
   compare a first CSI fingerprint from the first GAS response message to a stored CSI fingerprint;
   compare a second CSI fingerprint from the second GAS response message to the stored CSI fingerprint; and
   responsive to the first CSI fingerprint being a closer match to the stored CSI fingerprint than the second CSI fingerprint, connect the requesting computing device to an access point associated with the first GAS response message;
   responsive to connecting the requesting computing device to the access point on the channel, send an alert to the access point indicating that a spoofer device with the second CSI fingerprint may use the channel.

2. The non-transitory machine-readable storage medium of claim 1, further comprising instructions executable by the processor to:
   receive a beacon message on the channel;
   determine a beacon CSI fingerprint from the beacon message; and
   store the beacon CSI fingerprint as the stored CSI fingerprint.

3. The non-transitory machine-readable storage medium of claim 1, further comprising instructions executable by the processor to:
   send a request for a probe message on the channel;
   receive the probe message responsive to sending the request;
   determine a probe CSI fingerprint from the probe message; and store the probe CSI fingerprint as the stored CSI fingerprint.

4. The non-transitory machine-readable storage medium of claim 2, further comprising instructions executable by the processor to:
responsive to connecting the requesting computing device to the access point on the channel, receive a management message on the channel;
determine a management CSI fingerprint from the management message; and
store the management CSI fingerprint as the stored CSI fingerprint.

5. The non-transitory machine-readable storage medium claim 1, further comprising instructions executable by the processor to:
responsive to no GAS response messages being received within the predetermined time period after sending the GAS request message, send, by the computing device, a second GAS request message on a second channel.

6. A system for preventing MAC spoofing, the system comprising:
a processor;
a request engine circuit to:
send a generic advertisement service (GAS) request message on a first channel;
responsive to sending the GAS message, receive, within a predetermined time period, a set of GAS response messages on the first channel;
receive a beacon message on the channel;
determine a beacon CSI fingerprint from the beacon message; and
store the beacon CSI fingerprint as the stored CSI fingerprint; and
an access point determination engine circuit to:
responsive to receiving the set of GAS response messages, compare a CSI fingerprint of each GAS response message to a stored CSI fingerprint;
based on a comparison of the CSI fingerprints of each GAS response message of the set of GAS response messages to the stored CSI fingerprint, determine which GAS response message has a CSI fingerprint closest to the stored CSI fingerprint; and
send a request to a device associated with the CSI fingerprint closest to the stored CSI fingerprint to connect to the device as an access point for a network.

7. The system of claim 6, wherein the access point determination engine circuit is to:
determine that the devices associated with the CSI fingerprints that are not closest to the stored CSI fingerprint are spoofer devices.

8. The system of claim 6, wherein the access point determination engine circuit is to:
send an alert to the access point indicating that a first device associated with a first CSI fingerprint of the set of fingerprints is a spoofer device responsive to the first CSI fingerprint not being the CSI fingerprint closest to the stored CSI fingerprint.

9. The system of claim 6, wherein the access point determination engine circuit is to:
responsive to the set of GAS response messages comprising a single GAS response message, connect to an access point associated with the single GAS response message.

10. A method for preventing MAC spoofing, the method comprising:
sending, by a computing device, a request to join a wireless network;
enabling communication between the computing device and a set of access points to the wireless network via a respective set of channels;
transmitting, on a first channel of the set of channels, from the computing device, a generic advertisement service (GAS) request message to connect to a first access point on the first channel;
receiving, at the computing device, a beacon message on the first channel, the beacon message comprising a beacon CSI signature;
responsive to transmitting the GAS request message, receiving, within a predetermined amount of time after transmitting the GAS request message, a first GAS response message and a second GAS response message;
comparing a first CSI signature of the first GAS response message with the beacon CSI signature;
comparing a second CSI signature of the second GAS response message the beacon CSI signature; and
responsive to the second CSI signature being a closer match to the beacon CSI signature than the first CSI signature, facilitating connection of the computing device with a device associated with the second CSI signature as the first access point of the first channel for the computing device on the wireless network.

11. The method of claim 10, further comprising:
responsive to connecting the requesting computing device to the access point on the channel, sending an alert to the access point indicating that a spoofer device with the first CSI fingerprint may use the first channel.

12. The method of claim 10, further comprising:
responsive to connecting the requesting computing device to the first access point on the first channel, receiving a management message on the first channel;
determining a management CSI fingerprint from the management message; and
storing the management CSI fingerprint as a stored CSI print for comparison for the first channel.

13. The method of claim 10 further comprising:
responsive to no GAS response messages being received within the predetermined time period after sending the GAS request message, transmitting, by the computing device, a second GAS request message on a second channel.

* * * * *